C. B. CLARK.
Sash Cord Fasteners.

No. 152,897. Patented July 14, 1874.

Witnesses:
Charles M. Higgins
Arthur C. Fraser

Inventor:
Chas. B. Clark
Per Burke & Fraser
Attys

UNITED STATES PATENT OFFICE.

CHARLES B. CLARK, OF BUFFALO, NEW YORK.

IMPROVEMENT IN SASH-CORD FASTENERS.

Specification forming part of Letters Patent No. 152,897, dated July 14, 1874; application filed June 17, 1874.

*To all whom it may concern:*

Be it known that I, CHARLES B. CLARK, of Buffalo, Erie county, New York, have invented certain new and useful Improvements in Sash-Cord Irons or Fasteners, of which the following is a specification:

This invention relates to those devices which are secured by a screw to the sash at the end of the cord-groove to receive the knotted end of the weighted cord, and retain the same in connection with the sash; and it consists in forming the shell or body of the fastener and the screw in one piece, by which important advantages are secured, as hereinafter set forth.

Figure 1:
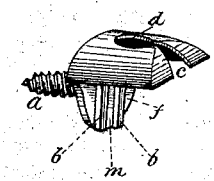
Figure 2:
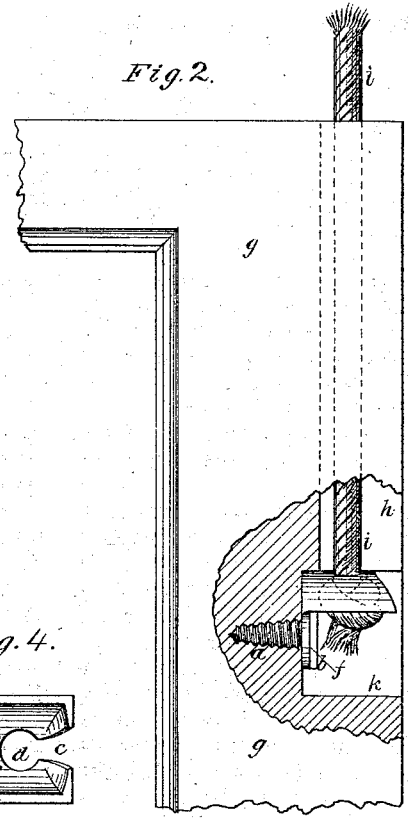
Figure 3:
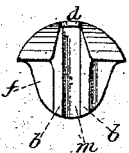

Figure 1 of the accompanying drawings is a perspective view of my improved fastener. Fig. 2 is a side elevation of the same, shown attached to the sash and cord, a portion of the former appearing in section. Fig. 3 is an end elevation, and Fig. 4 is an inverted plan view.

Figure 4:
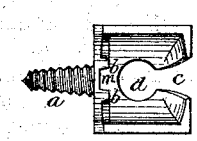

The form of the body of the fastener is that of a semi-cylindrical shell, as seen best in Fig. 1, which is provided with a central peripheral hole, $d$, from which a slot or cut, $c$, proceeds, and, extending to the limits of the shell, bifurcates the same, as shown in Figs. 3 and 4. The slot $c$ allows the insertion of the knotted end of the cord into the hole $d$, and the knot bears against and is retained by the under or concave side of the shell, as represented in Fig. 2. The inner end of the semi-cylinder is closed by a solid disk, from the center of which the conical screw $a$ projects, the disk answering to the head of the screw,—the screw, disk, and shell being cast as one homogeneous piece. On the inner face of the disk are formed two raised shoulders or ribs, $b$ $b$, Figs. 1 and 3, the space between which forms a groove, $m$, for the reception of the end of the screw-driver, by which the fastener is turned in driving the screw into the wood of the sash, as seen in Fig. 2. These ribs extending transversely across the disk permit of its being made thin, and yet possess the requisite strength, and obviate the source of weakness heretofore existing in this class of holders, viz., the loss of metal due to being formed with a screw-hole. The fastener is shown applied in Fig. 2. $g$ is the sash, and $h$ a groove in the side thereof, in which lies the cord $i$. At the end of the groove is bored a circular hole, $k$, of about the same diameter as that of the fastener. The fastener is placed in the hole, and the point of the screw $a$ inserted in the small hole made by the point of the bit, and the fastener turned by a screw-driver applied to the grooved face $f$ until the screw is fully inserted and the fastener held tightly in place, as seen in Fig. 2, in which position its upper or convex surface bears against the surface of the hole $k$ at each side of the groove $h$, and this bearing, together with that of the screw, is sufficient to resist the strain of the weighted cord.

Sash-cord fasteners, as heretofore constructed, have been formed with a screw-hole, through which an ordinary loose screw was passed to secure the fastener to the sash. The advantages of my fastener in having the screw formed solidly thereon are, that much greater strength is secured, the device is much more readily applied to the sash, and is more firmly held in the wood than when a detached screw is employed, while the cost of manufacture is sensibly reduced, and the labor of inserting them is materially lessened—advantages which together constitute it an important improvement in the manufacture.

I claim as my invention—

1. As a new article of manufacture, a sash-cord fastener having the screw formed solidly or in one piece with the body of the fastener, substantially as herein set forth.

2. The ribs $b$ $b$, in combination with the disk $f$ of the shell, substantially as and for the purposes set forth.

In witness whereof I have hereunto signed my name in the presence of two subscribing witnesses.

CHARLES B. CLARK.

Witnesses:
 H. R. CLARK,
 JOHN K. CLARK.